(12) United States Patent
Zhou

(10) Patent No.: US 9,563,009 B2
(45) Date of Patent: Feb. 7, 2017

(54) BACKLIGHT MODULE AND DISPLAY DEVICE

(71) Applicant: Shezhen China Star Optoelectronics Technology Co., Ltd., Shenzhen, Guangdong (CN)

(72) Inventor: Gege Zhou, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 224 days.

(21) Appl. No.: 14/400,544

(22) PCT Filed: Oct. 24, 2014

(86) PCT No.: PCT/CN2014/089431
§ 371 (c)(1),
(2) Date: Nov. 11, 2014

(87) PCT Pub. No.: WO2016/061811
PCT Pub. Date: Apr. 28, 2016

(65) Prior Publication Data
US 2016/0274296 A1 Sep. 22, 2016

(30) Foreign Application Priority Data
Oct. 21, 2014 (CN) .......................... 2014 1 0564004

(51) Int. Cl.
*G02B 6/00* (2006.01)
*F21V 8/00* (2006.01)

(52) U.S. Cl.
CPC ............. *G02B 6/0088* (2013.01); *G02B 6/005* (2013.01)

(58) Field of Classification Search
CPC ... G02B 6/0065; G02B 6/0081; G02B 6/0086; G02B 6/0088; G02B 6/0091; G02B 6/0093
See application file for complete search history.

(56) References Cited

U.S. PATENT DOCUMENTS

| | | | | |
|---|---|---|---|---|
| 7,520,652 | B2 * | 4/2009 | Yamashita | G02B 6/0013 362/608 |
| 2005/0099790 | A1 * | 5/2005 | Kang | G02B 6/0055 362/632 |
| 2010/0315575 | A1 * | 12/2010 | Chang | G02F 1/133308 349/62 |
| 2011/0187956 | A1 * | 8/2011 | Kim | G02F 1/1333 349/58 |

(Continued)

FOREIGN PATENT DOCUMENTS

| | | |
|---|---|---|
| CN | 1979305 A | 6/2007 |
| CN | 201051200 Y | 4/2008 |

*Primary Examiner* — Julie Bannan
(74) *Attorney, Agent, or Firm* — Andrew C. Cheng

(57) ABSTRACT

The present invention discloses a backlight module, which comprises a plastic frame, a backplane, a light guide and an optical film, the backplane comprises a mutually perpendicular vertical plate and horizontal plate, the plastic frame and the light guide are provided inside the backplane, the optical film is close to the upper surface of the plastic frame and the light guide. The present invention further provides a display device, which reduces the size of the plastic frame through pasting the optical film on the upper surface of the plastic frame and the light guide, achieving the ultra-narrow frame design.

7 Claims, 1 Drawing Sheet

(56) References Cited

U.S. PATENT DOCUMENTS

| | | | | |
|---|---|---|---|---|
| 2012/0113369 A1* | 5/2012 | Kim | ............................ | G09F 3/10 |
| | | | | 349/122 |
| 2012/0169961 A1* | 7/2012 | Ha | ...................... | G02F 1/133308 |
| | | | | 349/61 |
| 2012/0182493 A1* | 7/2012 | Hwang | .............. | G02F 1/133308 |
| | | | | 349/58 |
| 2014/0002768 A1* | 1/2014 | Kuo | .................. | G02F 1/133512 |
| | | | | 349/60 |
| 2014/0003092 A1* | 1/2014 | Takada | .................. | G02B 6/0093 |
| | | | | 362/624 |
| 2014/0092339 A1* | 4/2014 | Yoshimura | ......... | G02F 1/133308 |
| | | | | 349/58 |
| 2014/0146269 A1* | 5/2014 | Kim | .................. | G02F 1/133308 |
| | | | | 349/58 |
| 2014/0177268 A1* | 6/2014 | Zhou | ....................... | G02B 6/005 |
| | | | | 362/606 |
| 2015/0234511 A1* | 8/2015 | Wang | ..................... | G06F 3/0412 |
| | | | | 345/173 |
| 2015/0237182 A1* | 8/2015 | Lee | ...................... | H04M 1/0266 |
| | | | | 455/566 |

* cited by examiner

BACKLIGHT MODULE AND DISPLAY DEVICE

BACKGROUND OF THE INVENTION

1. Field of the Invention

The present invention relates to a display device, and in particular to a backlight module and a display device.

2. The Related Arts

Currently, the liquid crystal display device as a display part of electronic device has been widely used in various electronic products, the frame of these electronic devices become narrower and narrower; however, the backlight module is an important part of the liquid crystal display device, its borders are bound to become narrower and narrower.

Under normal circumstances, a backlight module comprises a light guide, a plastic frame provided around the light guide to play a role of supporting and fixing, a flexible light source circuit board and a shading tape, the flexible light source circuit board is fixed on the light guide and the plastic frame through a shading tape, the optical film is also fixed on the plastic frame through a shading double side adhesive tape, the liquid crystal display is fixed around the backlight unit through the double side adhesive tape. But the positioning methods of the film and the plastic frame are different, if the positioning methods being incorrect may not achieve the requirement of the narrow frame design.

SUMMARY OF THE INVENTION

According to the lack of prior art, the present invention provides a backlight module with an ultra-narrow frame and a display device.

In order to achieve the above purpose, the present invention adopts the technical solution as shown below:

A backlight module, wherein it comprises a plastic frame, a backplane, a light guide and an optical film, the backplane comprises a mutually perpendicular vertical plate and horizontal plate, the plastic frame and the light guide are provided inside the backplane, the optical film is close to the upper surface of the plastic frame and the light guide.

Wherein the backlight module further comprises a shading sheet, the shading sheet is pasted on the upper surface and the side surface of the optical film, and is partially pasted on the vertical plate of the backplane.

Wherein there is a gap between the light guide and the plastic frame.

Wherein the backlight module further comprises a reflective sheet, the reflective sheet is provided on the lower surface of the light guide and is close to the horizontal plate.

Wherein the shading sheet is a shading tape.

Meanwhile, the present invention further provides a display device, which comprises a plastic frame, a backplane, a light guide, an optical film and a liquid crystal glass, the backplane comprises a mutually perpendicular vertical plate and horizontal plate, the plastic frame and the light guide are provided inside the backplane, the optical film is close to the upper surface of the plastic frame and the light guide.

Wherein the backlight module further comprises a shading sheet, the shading sheet is pasted on the upper surface and the side surface of the optical film, and is partially pasted on the vertical plate of the backplane.

Wherein the backlight module further comprises a reflective sheet, the reflective sheet is provided on the lower surface of the light guide and is close to the horizontal plate.

Wherein the shading sheet is a shading double side adhesive tape, the liquid crystal glass is pasted on the upper surface of the optical film through the shading sheet.

The present invention reduces the size of the plastic frame through pasting the optical film on the upper surface of the plastic frame and the light guide, achieving the ultra-narrow frame design.

DETAILED DESCRIPTION OF THE PREFERRED EMBODIMENTS

The following will combine the drawings of the embodiments to further describe.

Figure 1:
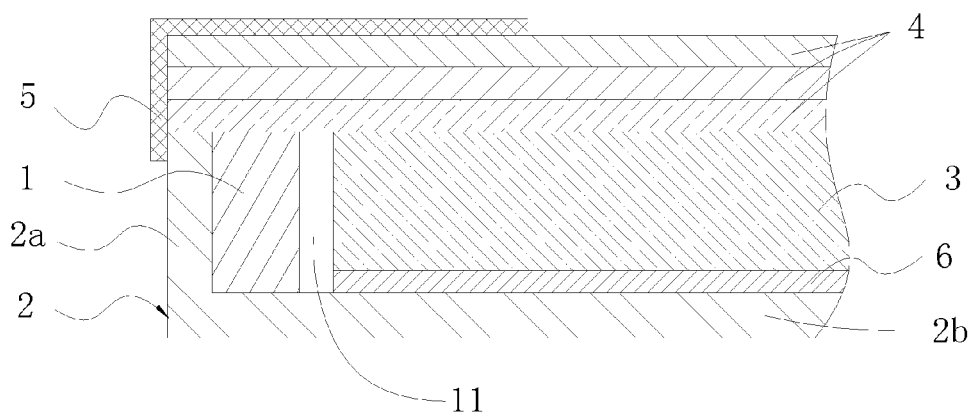
FIG. 1 is a structure diagram of a backlight module in the embodiment of the present invention.

Refer to FIG. 1, a backlight module in the embodiment of the present invention comprises a plastic frame 1, a backplane 2, a light guide 3 and an optical film 4. Wherein the backplane 2 as a shell is used to carry and protect the light guide 3 and the optical film 4 inside the backlight module, which comprises a mutually perpendicular vertical plate 2a and horizontal plate 2b, the plastic frame 1 and the light guide 3 are provided inside the backplane 2, the optical film 4 is close to the upper surface of the plastic frame 1 and the light guide 3.

The backlight module in the present embodiment further comprises a shading sheet 5, the shading sheet 5 is pasted on the upper surface and the side surface of the optical film 4, and is partially pasted on the vertical plate 2a of the backplane 2, on one hand it protects both side of the upper surface and both side surface of the optical film 4, on the other hand it absorbs and shields the light emitted from both side of the optical film 4, preventing the light pollution. Meanwhile, the shading sheet is a shading tape.

Specifically, there is a gap 11 between the light guide 3 and the plastic frame 1.

Furthermore, the backlight module further comprises a reflective sheet 6, the reflective sheet 6 is provided on the lower surface of the light guide 3 and is close to the horizontal plate 2b, which is used to reflect the light emitted to the bottom of the light guide 3, raising the light utilization and the backlight uniformity. Meanwhile, the height of the plastic frame 1 is equal to the sum of the heights of reflective sheet 6 and the light guide 3, the upper surface of the vertical plate 2 of the backplane 2 is flush with the plastic frame 1. The optical film 4 is a multi-layer film structure, pasting on the upper surface of the backplane 2 and the plastic frame 1.

Figure 2:
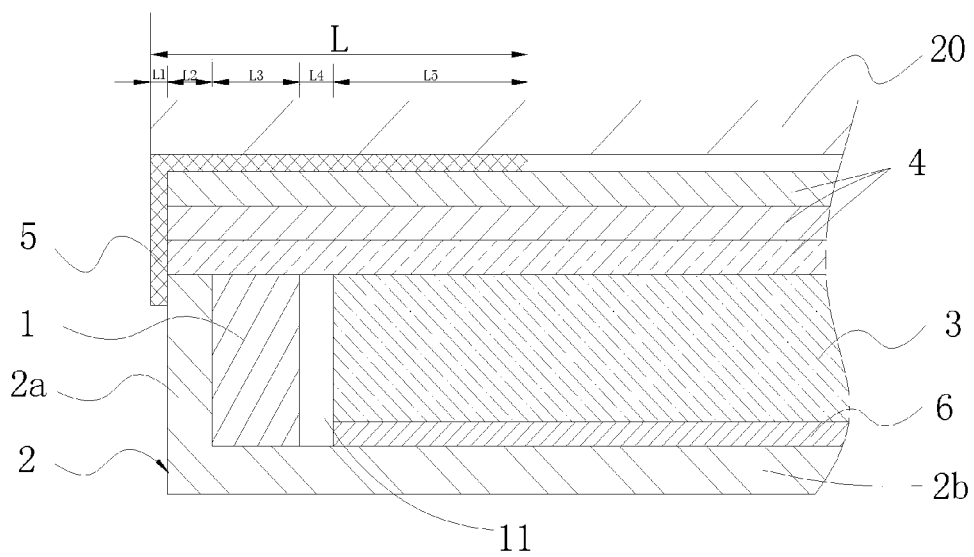
FIG. 2 is a structure diagram of a display device in the embodiment of the present invention.

Otherwise, the present invention also provides a display device, as shown in FIG. 2, the display device comprises a plastic frame 1, a backplane 2, a light guide 3, an optical film 4 and a liquid crystal glass 20, the liquid crystal glass 20 is fixed on the upper surface of the optical film 4, the backplane 2 comprises a mutually perpendicular vertical plate 2a and horizontal plate 2b, the plastic frame 1 and the light guide 3 are provided inside the backplane 2, the optical film 4 is close to the upper surface of the plastic frame 1 and the light guide 3.

Through such design, it makes the frame width L be the sum of the thickness L1 of the shading sheet 5, the thickness L2 of the vertical plate 2a, the thickness L3 of the plastic frame 1, the width L4 of the gap 11 and the extending length L5 of the shading sheet 5. It only needs to reduce the thickness of the plastic frame 1 to achieve the ultra-narrow frame design of the backlight module and the display device.

The above description is only the specific embodiment in the present invention, be noted that, for those ordinary technical personnel in this art, it also can be improved and modified under the circumstance of without disobeying the present application principle, these improvements and modifications are also considered in the scope of the present application.

What is claimed is:

1. A backlight module, wherein it comprises a plastic frame, a backplane, a light guide and an optical film, the backplane comprising a mutually perpendicular vertical plate and horizontal plate, the plastic frame and the light guide being provided inside the backplane, upper surface of the vertical plate of the backplane being flush with the plastic frame, the optical film being a multi-layer film structure, which is close to the upper surface of the plastic frame and the light guide, wherein it further comprises a shading sheet, the shading sheet is pasted on the upper surface and the side surface of the optical film, and is partially pasted on the vertical plate of the backplane.

2. The backlight module as claimed in claim 1, wherein there is a gap between the light guide and the plastic frame.

3. The backlight module as claimed in claim 2, wherein it further comprises a reflective sheet, the reflective sheet is provided on the lower surface of the light guide and is close to the horizontal plate, the height of the plastic frame is equal to the sum of the heights of reflective sheet and the light guide.

4. The backlight module as claimed in claim 1, wherein the shading sheet is a shading tape.

5. A display device, wherein it comprises a plastic frame, a backplane, a light guide, an optical film and a liquid crystal glass, the backplane comprising a mutually perpendicular vertical plate and horizontal plate, the plastic frame and the light guide being provided inside the backplane, upper surface of the vertical plate of the backplane being flush with the plastic frame, the optical film being a multi-layer film structure, which is dose to the upper surface of the plastic frame and the light guide, wherein it further comprises a shading sheet, the shading sheet is pasted on the upper surface, the side surface of the optical film, and the vertical plate of the backplane.

6. The backlight module as claimed in claim 5, wherein it further comprises a reflective sheet, the reflective sheet is provided on the lower surface of the light guide and is close to the horizontal plate, the height of the plastic frame is equal to the sum of the heights of reflective sheet and the light guide.

7. The backlight module as claimed in claim 5, wherein the shading sheet is a shading double side adhesive tape, the liquid crystal glass is pasted on the upper surface of the optical film through the shading sheet.

* * * * *